United States Patent [19]

Chiang et al.

[11] 4,443,553

[45] Apr. 17, 1984

[54] PRODUCTION OF FLUID CATALYTIC CRACKING CATALYSTS

[75] Inventors: Robert L. Chiang; Julius Scherzer, both of Anaheim, Calif.

[73] Assignee: Harshaw/Filtrol Partnership, Oakland, Calif.

[21] Appl. No.: 420,439

[22] Filed: Sep. 20, 1982

[51] Int. Cl.³ .............................................. B01J 29/06
[52] U.S. Cl. ...................................... 502/68; 502/64; 502/65
[58] Field of Search ............... 252/455 Z; 502/64, 68, 502/65

[56] References Cited

U.S. PATENT DOCUMENTS 4,100,108  7/1978  Alafandi et al. ................ 252/455 Z
4,176,090  11/1979 Vaughan et al. ............... 252/455 Z Primary Examiner—Carl F. Dees
Attorney, Agent, or Firm—Andrew E. Barlay

[57] ABSTRACT

In the process of preparing fluid catalytic cracking catalysts where an aqueous slurry, containing a zeolite, or zeolites, an alumina-containing binder, a clay and a silica source, is subjected to drying to form essentially water-free solid catalyst particles, the viscosity of the aqueous slurry can be significantly reduced by incorporation of a small but effective amount of $[Al_2(OH)_{6-y}Cl_y]_x$ additive. Due to this decrease in viscosity, the solids content of the slurry can be raised until the original, additive-free viscosity level, is reached, which, in turn, results in increased solids throughput rate in the drying step with corresponding savings of thermal energy and improved catalyst production efficiency.

7 Claims, 1 Drawing Figure

PRODUCTION OF FLUID CATALYTIC CRACKING CATALYSTS

BACKGROUND OF THE INVENTION

Preparation of fluid catalytic cracking catalysts is generally accomplished by admixing in an aqueous medium particles of zeolites, clay, alumina-containing binder, and a silica source. The produced aqueous slurry is usually subjected to agitation to uniformly disperse the solids within the slurry, and then the slurry is subjected to drying to form essentially water-free solid catalyst particles.

From an efficiency and economy point of view, it is generally preferred to utilize slurries of high solids content. The higher the solids content of the slurry, the less water has to be removed in the drying step, which, on one hand, decreases the fuel consumption of the drying process, and on the other hand, allows the most efficient utilization of the drying equipment. A limiting factor is the slurry viscosity, which, at high solids contents, makes the transfer of the slurry from the mixing vessel to the drying equipment difficult if not impossible. Further, in the case where the slurry is to be subjected to spray-drying in conventional spray-drying equipment utilizing discs or nozzles, high viscosity slurries cannot be efficiently processed. Thus, it was found that in the preparation of fluid catalytic cracking catalysts from aqueous slurries containing zeolites, alumina-containing binders, a clay and a silica source, aqueous slurries of high solids content cannot be readily processed in conventional spray-drying equipment due to the high viscosity. This is particularly true if the alumina-containing binder is an alpha alumina monohydrate derived from the decomposition of aluminum alkoxides with water.

It has now been discovered that if a small, but effective, amount of aluminum hydroxychloride additive, having the general formula of $[Al_2(OH)_{6-y}Cl_y]_x$, where $x=1$ to 6 and $y=1$ to 2, is incorporated in the aqueous slurry used for the preparation of fluid catalytic cracking catalysts, the viscosity of the slurry can be significantly reduced.

This reduction in slurry viscosity allows the solids content of the slurry to be increased up to the viscosity level the slurry had prior to the incorporation of the additive. This increase in solids content can amount to significant quantities in the neighborhood of up to about 20–30% by weight based on the original solids content of the slurry, which considerably improves the fuel efficiency of the drying step and also allows increased production rates.

Aluminum hydroxychloride has been employed by the prior art as the alumina-containing binder in the preparation of cracking catalysts. Thus, Canadian Pat. No. 967,136 of May 6, 1975 (Lengade, A. T.), describes the use of an aluminum hydroxychloride sol as binder in the preparation of a zeolite-based cracking catalyst. In the process of the aforementioned Canadian patent, the zeolite and clay components of the catalyst are dry mixed, then combined with an alumina-containing sol prepared by the dissolution of aluminum metal with hydrochloric acid. The aqueous alumina sol, containing about 25% by weight $Al_2O_3$ and 6.7% chloride as Cl, is used to provide 5–15% by weight alumina binder content (calculated as $Al_2O_3$) for the catalyst. After water addition, the sol is admixed with the dry mixed zeolite and clay components to form a slurry of 30% solids content. The slurry is homogenized in a colloidal mill in the presence of a sodium pyrophosphate dispersant, then spray dried. When this relatively large quantity of sol is incorporated in the catalyst mixture, difficulties may arise as far as the end uses of the catalyst are concerned due to a perhaps unacceptably high residual chloride content. These problems are minimized when the aluminum hydroxychloride is used only in small quantities as a viscosity-reducing additive.

The structure of basic aluminum hydroxychloride has been established by nuclear magnetic resonance (NMR) studies and such study was published in the 1981 issue of the Z. anorg. allg. Chem. Volume 483, pages 153–160.

BRIEF SUMMARY OF THE INVENTION

Addition of a small, but effective, amount of aluminum hydroxychloride to an aqueous slurry employed in the preparation of fluid catalytic cracking catalysts and containing a mixture of dispersed zeolite, alumina-containing binder, a clay, and a silica source, significantly reduces the viscosity of the slurry. This reduction in slurry viscosity allows the increase of the slurry solids concentration to a level which provides the same viscosity as the additive-free slurry. Aluminum hydroxychloride quantities of about 0.5 to about 2.5% by weight, preferably about 0.5% to about 2.0% by weight (calculated as $Al_2O_3$ on the solids content of the slurry) allow an increase in slurry solids content up to about 20% by weight, thus allowing increased slurry throughput rates in the drying step.

BRIEF DESCRIPTION OF THE FIGURE

The FIGURE graphically shows the viscosity decrease of an aqueous slurry containing a mixutre of zeolite, clay, an alumina binder derived from the hydrolysis of aluminum alkoxides and a silica source as a function of aluminum hydroxychloride addition between 0 and 1.6% calculated as % $Al_2O_3$.

DETAILED DESCRIPTION OF THE INVENTION

Figure 1:
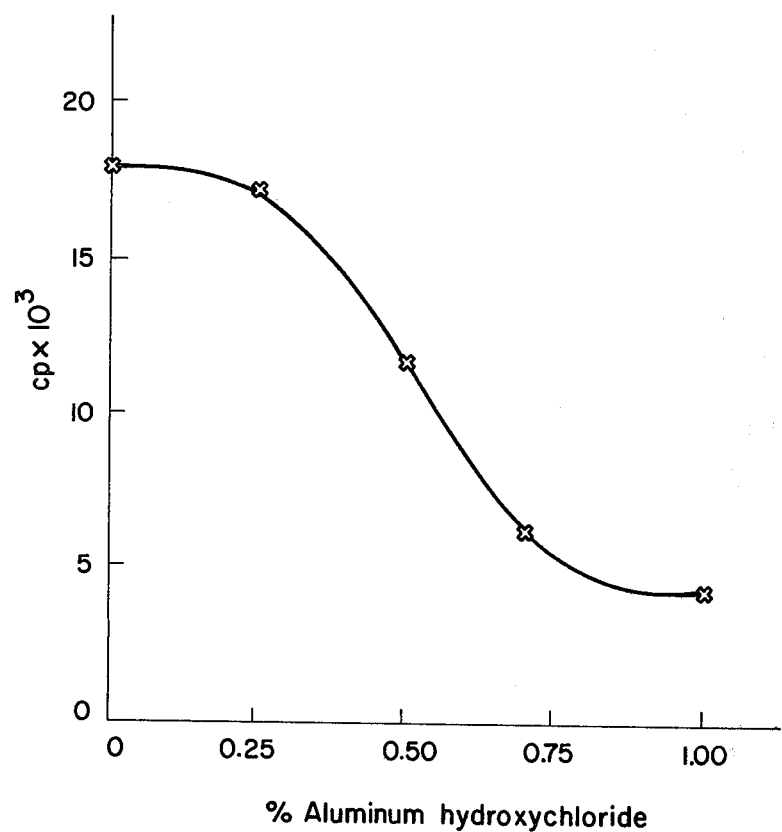

This invention relates to improvements in the production of fluid catalytic cracking catalysts. More particularly, it concerns the incorporation of a small, but effective, amount of aluminum hydroxychloride additive into aqueous slurries containing dispersed therein a mixture of zeolite, clay, an alumina-containing binder, and a silica source to reduce the viscosity of the slurry, thus allowing the solids content of the slurry to be raised.

The additive employed in the instant process has the general formula $[Al_2(OH)_{6-y}Cl_y]_x$, where $x=1$ to 6 and $y=1$ to 2. The aluminum hydroxychloride additive employed for the reduction of slurry viscosity is generally employed as an aqueous solution or colloidal sol, and can be prepared either by the dissolution of metallic aluminum in hydrochloric acid or by the dissolution of hydrated alumina ($Al_2O_3 \cdot xH_2O$) in hydrochloric acid under controlled conditions. It is also available commercially as a solid product.

Commercially available aqueous aluminum hydroxychloride sols generally contain from about 22 to about 27% by weight $Al_2O_3$, and the chloride content of these commercial sols varies between about 6–8% by weight. Since the aluminum hydroxychloride additive of the invention is incorporated into an aqueous slurry, for ease of operation, incorporation of the additive in aqueous solution or in sol form is preferred, although the powdered product can be used as well.

In the preparation of fluid catalytic cracking catalyst, generally an aqueous slurry is provided containing a dispersed mixture of zeolite, clay, alumina-containing binder, and a silica source. This aqueous slurry is then subjected to a thermal treatment to produce essentially water-free catalyst particles. For the purposes of this invention, the term "zeolite" refers to an alumino silicate having a crystalline structure as determined by x-ray diffraction. These zeolites are well known in the art, and their preparation, as well as their properties, is extensively dealt with by numerous publications. In the instant invention, faujasite zeolites of the Y-type are preferably utilized. It is known that in the preparation of Y-type zeolites, the product often contains a relatively high percentage of alkali metal ions which are considered detrimental for many applications. These alkali metal ions, such as sodium, can be exchanged with more preferred cations, for example, ammonium, hydrogen, alkaline earth, and rare earth metal cations, to render the zeolite suitable for defined end uses. In the instant invention, the preferred zeolite constituent of the produced fluid catalytic cracking catalyst is a rare earth metal cation exchanged Y-type zeolite although other types, such as hydrogen Y-zeolite, ammonium exchanged Y-zeolite or mixtures of all of these can be suitably employed.

The quantity of Y-type zeolite employed in the aqueous slurry which is used to make the fluid catalytic cracking catalyst is generally in the range of from about 10–35% by weight of the total solids content, the range from about 15–25% by weight is being preferred.

The alumina-containing binder utilized for the preparation of the fluid catalytic cracking catalyst is an alumina of essentially alpha alumina monohydrate structure. This alpha alumina monohydrate useful in the process of the present invention is generally derived from the water hydrolysis of aluminum alkoxides, such as produced by the Ziegler process. The alpha alumina monohydrate, which is characterized by a surface area in excess of about 200 $m^2/g$, an $Al_2O_3$ content of about 75% by weight, and a loose bulk density of about 690 $kg/m^3$, is commercially available.

Certain other "pseudoboehmitic" aluminas can also be used as binders in the preparation of the fluid catalytic cracking catalysts of the present process. These "pseudoboehmitic" aluminas are characterized by an x-ray diffraction pattern wherein a broad peak appears in the range of 10 to 18 angstrom peaking at 13.5 angstrom when $CuK_\alpha$ ration is employed. These "pseudoboehmitic" aluminas are further characterized by an $Al_2O_3$ content of at least about 70% by weight, a surface area in excess of about 200 $m^2/g$, and a loose bulk density from about 593 to about 753 $kg/m^3$.

The quantity of alumina binder present in the aqueous slurry is generally in the range from about 7–21% by weight (calculated as $Al_2O_3$) and based on the total solids content of the aqueous slurry. For optimum results, the alumina binder is prior to incorporation in the aqueous slurry, treated, for example, with an aqueous formic acid solution as described in Example 2 of U.S. Pat. No. 4,198,319 or in U.S. Pat. No. 4,086,187. The treatment of the alumina binder with a peptizing acid, according to these patents, is incorporated by reference. After treatment with the peptizing acid, the aqueous, acidic dispersion of the alumina binder is added to the aqueous slurry containing the other components of the catalyst.

The clay employed for the preparation of the catalyst can be selected from clays generally employed for this purpose, for example, kaolinite and crystalline kaolin. Suitable kaolins include ball clay and halloysite. For best results a crystalline kaolin is utilized in amounts in the range of about 60–70% by weight [calculated on the dry weight of the clay when dried at about 930° C. (1700° F.) for about 1 hour].

Suitable silicate source is a polysilicate, such as described in detail in U.S. Pat. No. 4,086,187, referred to herein-before. The quantity of polysilicate incorporated in the aqueous slurry is in the range of about 1–7% by weight based on the solids content of the slurry.

All of these ingredients are added to the slurry under agitation in order to ensure uniform mixing and dispersion. Subsequent to achieving an essentially uniform mixture, the viscosity-reducing additive is incorporated in aluminum hydroxychloride additive incorporated in the slurry can vary in the range from about 0.5% to about 2.5% by weight (calculated as $Al_2O_3$, and based on the total solids content of the slurry). The preferred quantity of additive is within the range from about 0.5% to about 2.0% by weight. The quantity to be added to the aqueous slurry generally depends on the final solids content of the slurry to be achieved.

The higher the desired final solids content, the more aluminum hydroxychloride is added within the range recited above. It was, however, observed that aluminum hydroxychloride quantities in excess of about 2.5% by weight do not appreciably affect the viscosity of the slurry, and while such higher amounts do not deleteriously affect the catalyst composition, they do not achieve any significant slurry viscosity decrease. Within a short period of time after the addition of the aluminum hydroxychloride additive, it can be observed that the slurry viscosity is reduced from its original level. This can be established initially by actually mesuring the viscosity change or, if desired, a curve can be prepared for each catalyst composition denoting the viscosity change as a function of the quantity of additive to be added. By establishing the achieved viscosity reduction from the graph, the solids content of the slurry can be raised to any desired level up to the original (additive-free) level by incorporating in the aqueous slurry the ingredients of the catalyst composition in the correct weight ratio.

In plant-scale operations, due to the viscosity-reducing nature of the additive, the achievable increase in solids content is preestablished and the slurry to be subjected to drying is prepared with an increased solids content.

It has been found that under normal conditions, i.e., in the absence of any aluminum hydroxychloride additive, the maximum solids content of aqueous slurries to be subjected to spray drying for the preparation of solid, essentially water-free fluid catalytic cracking catalysts of the composition hereinbefore shown, is in the neighborhood of about 20–25% by weight. Addition of the slurry viscosity-reducing additive, even if applied in quantities selected from the lower end of the range, allows spray drying of slurries with solids content as much as about 30% by weight, which corresponds to an increase of at least 20%. Such an increase, as it is evident to those skilled in the art of catalyst manufacture, represents a significant improvement in the efficiency of fluid catalytic cracking catalyst production, both from an energy usage and from a throughput point of view.

The following examples will further show the novel aspects of the present process.

EXAMPLE I

A fluid catalytic cracking catalyst was prepared from an aqueous slurry having a solids content of 25% by weight and containing a blend of Y-type, rare earth metal exchanged zeolites 18%, alpha alumina monohydrate binder 18%, kaolin-type clay 61.25%, ammonium polysilicate 2.5%, and aluminum hydroxychloride additive (as $Al_2O_3$) 0.25%. (All percentages are weight percent and are based on the total solids content of the slurry.) The aqueous slurry was prepared by first peptizing the alumina binder with aqueous formic acid under agitation in a slurry containing 10% by weight binder ($Al_2O_3$ basis). The peptized alumina slurry was then combined with the clay component of the catalyst composition, and the mixture was vigorously stirred for about 10 minutes to obtain dispersion of the clay in the slurry. The zeolite components were then added to the slurry and the aqueous mixture was again vigorously agitated for a period of about 10 minutes. Finally, the ammonium polysilicate was added under agitation to assure uniform mixing and dispersion of the slurry components. The slurry viscosity was then established and found to be 18660 cps. Addition of 0.25% aluminum hydroxychloride ($Al_2O_3$ basis) followed in solid form under agitation. The viscosity of the aqueous slurry was then again tested and found to be 17400 cps, a 9.3% reduction of the original viscosity.

The experiment was repeated using the same components in essentially the same weight ratio for the preparation of the catalyst with the exception of the additive quantity. Increasing quantities of aluminum hydroxychloride additive were incorporated in the individual slurries, and the viscosities of each aqueous slurry were determined prior to and subsequent to the incorporation of the additive. The results are show in Table I.

TABLE I

| Effect of Aluminum Hydroxychloride Additive Quantity on Slurry Viscosity | | | | |
|---|---|---|---|---|
| Additive % ($Al_2O_3$ basis) | 0.25 | 0.5 | 0.7 | 1.0 |
| Viscosity in cps before addn. of additive | 18660 | 17100 | 17060 | 18320 |
| Viscosity in cps after addn. of additive | 17400 | 11760 | 5240 | 4280 |

The results are also graphically shown in the FIGURE.

These results clearly indicate the surprising effect of aluminum hydroxychloride additive incorporations on the viscosities of the aqueous slurries. At increasing aluminum hydroxychloride quantities, the slurry solids content could be increased by at least about 20% by weight, and even higher. The aqueous slurries were then spray-dried, and the solid, essentially water-free catalyst particles, were recovered. No change in activity was observed when the additive-containing catalysts were compared to a catalyst made without the aluminum hydroxychloride additive.

EXAMPLE II

The catalyst composition of Example I was modified by using as the zeolite component only one Y-type rare earth metal exchanged zeolite and the ratio of clay to ammonium polysilicate was also altered. Thus, aqueous slurries of 25% by weight solids contents were prepared containing Y-type rare earth metal exchanged zeolite 18%, alpha alumina monohydrate binder 18%, kaolin-type clay 59%, ammonium polysilicate 4%, and varying amounts of aluminum hydroxychloride additive from 0.4% to 1.6% ($Al_2O_3$ basis). All percentages used are weight % and are based on the total solids content of the aqueous slurry. The slurries were prepared in the same manner as shown in Example I using the same sequence of addition of the components as described above. The viscosity change of the aqueous slurries is shown in Table II.

TABLE II

| Effect of Aluminum Hydroxychloride Additive Quantity on Slurry Viscosity | | | | |
|---|---|---|---|---|
| Additive % ($Al_2O_3$ basis) | 0.4 | 0.8 | 1.2 | 1.6 |
| Viscosity in cps before addn. of additive | 19500 | 18150 | 17399 | 19700 |
| Viscosity in cps after addn. of additive | 18250 | 12900 | 3800 | 3100 |

It can be observed that significant viscosity decrease is imparted to the aqueous slurries by the addition of the aluminum hydroxychloride additive. Again, as in Example I, the aqueous slurries were spray dried, and the activity of the produced catalyst particles were not affected by the presence of the additive.

It was further found in other experiments that the quantity of aluminum hydroxychloride quantity required to impart significant viscosity decrease does not exceed the 2.5% ($Al_2O_3$ base) upper limit when the amounts of silica were varied between the described limits and/or when the zeolite types (within the class shown) were changed.

We claim:

1. In the process of producing fluid catalytic cracking catalysts by spray drying, an aqueous slurry containing a mixture of a Y-type zeolite, an alumina-containing binder, and a silica source selected from naturally occurring and synthetic silica-containing materials and mixtures thereof, the improvement which comprises incorporating in the slurry a slurry viscosity-reducing additive of the general formula $[Al_2(OH)_{6-y}Cl_y]_x$, where x is within the range of 1 and 6, and y is in the range of 1 to 2, the additive being added to the slurry in an amount equivalent to from about 0.5% to about 2.5% by weight, calculated as $Al_2O_3$, based on the solids content of the slurry, spray drying the slurry, and recovering essentially water-free catalyst particles.

2. The process of claim 1, wherein the naturally occurring silica source is clay.

3. The process of claim 1, wherein the synthetic silica source is ammonium polysilicate.

4. The process of claim 1, wherein the alumina binder is an alpha alumina monohydrate derived from the hydrolysis of alkoxy aluminates.

5. The process of claim 1, wherein the alumina binder is a pseudoboehmitic alumina.

6. The process of claim 1, wherein the zeolite is selected from rare earth metal exchanged Y-zeolites, ammonium or hydrogen-exchanged Y-zeolites or from mixtures of these.

7. The process of claim 1, wherein the quantity of additive incorporated in the slurry is in the range from about 0.5% to about 2% by weight, calculated as $Al_2O_3$, and based on the solids content of the slurry to be spray dried.

* * * * *

UNITED STATES PATENT AND TRADEMARK OFFICE
CERTIFICATE OF CORRECTION

PATENT NO. : 4,443,553
DATED : April 17, 1984
INVENTOR(S) : Robert L. Chiang and Julius Scherzer It is certified that error appears in the above-identified patent and that said Letters Patent are hereby corrected as shown below:

Column 4, lines 19, 20, 21, "additive is incorporated in aluminum hydroxychloride additive" should be --additive is incorporated in the aqueous slurry also under agitation. The quantity of aluminum hydroxychloride additive--

Signed and Sealed this

Thirtieth Day of April 1985

[SEAL]

Attest:

DONALD J. QUIGG

*Attesting Officer*    *Acting Commissioner of Patents and Trademarks*